April 22, 1930.                A. J. ELIAS                1,755,245
                                NUT LOCK
                           Filed Dec. 31, 1928
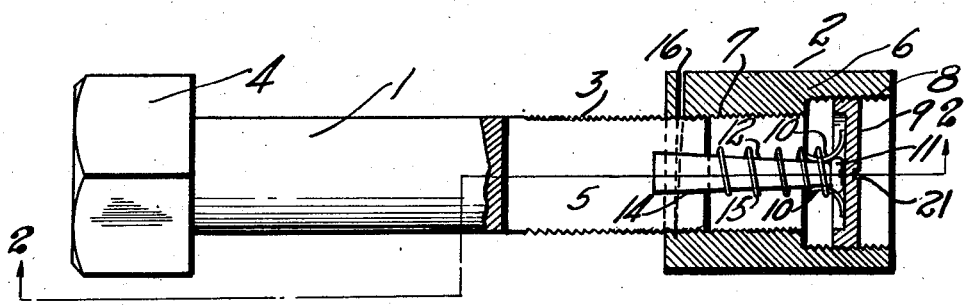
Fig. 1.
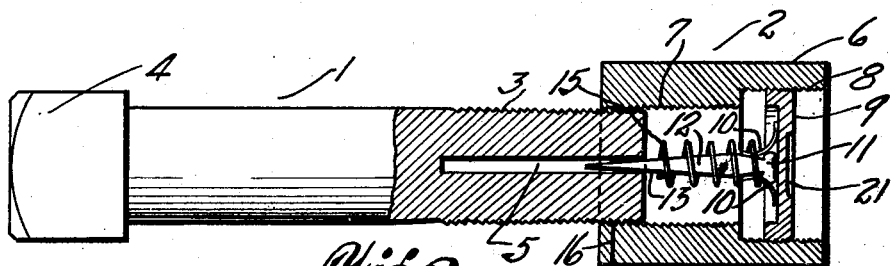
Fig. 2.
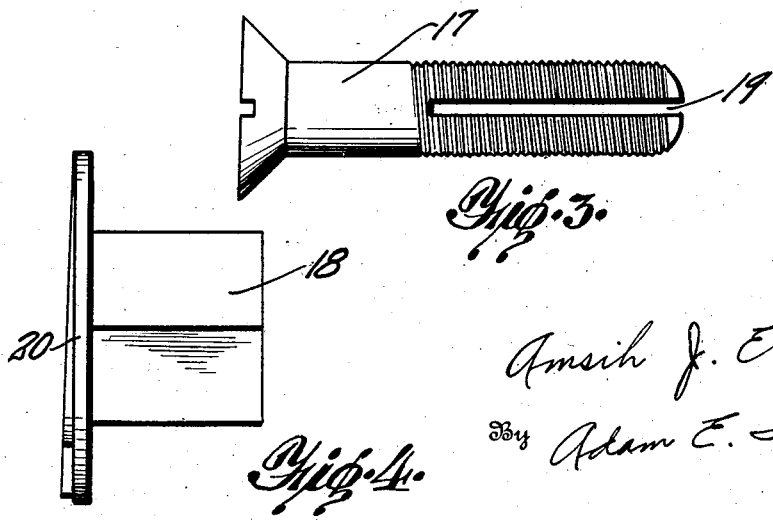
Fig. 3.
Fig. 4.
Inventor
Amsih J. Elias
By Adam E. Fisher.
Attorney Patented Apr. 22, 1930

1,755,245

UNITED STATES PATENT OFFICE

AMSIH JOHN ELIAS, OF DECATUR, ILLINOIS

NUT LOCK

Application filed December 31, 1928. Serial No. 329,559.

This invention relates to nut locks and the main object is to provide a positive and efficient lock to prevent accidental displacement of a nut from the bolt upon which it is threaded.

Another object is the provision of a nut lock which will be simple and durable in construction.

The foregoing and other objects of the invention together with means whereby the same may be carried out will best be understood from the following description of a certain preferred embodiment of the invention taken in connection with the accompanying drawing in which:

Figure 1 is a partially sectional view of a bolt and nut constructed in accordance with the invention.

Figure 2 is a section along the line 2—2 in Figure 1.

Figure 3 is a side elevation of a modified form of bolt.

Figure 4 is a side elevation of a modified form of nut.

Referring now more particularly to the drawing the reference numerals 1 and 2 denote the bolt and nut respectively, the same being formed of any suitable material. The bolt 1 has the threaded end 3 and the conventional head 4 and the end of this bolt is split by a diametrically extended slot 5 into two sections as shown. The nut 2 comprises an outer casing 6 having a threaded bore 7 slightly larger in diameter than the bolt 1 and a threaded socket 8 at one end. A threaded plug 9 is adjustably mounted in this socket 8 and carries the spring clips 10 which are adapted to receive the head 11 of the bolt expander 12 in such manner that the said expander 12 may rotate in the clips but will be held therein in the position shown. The said bolt expanded 12 is flattened or tapered toward its free end as shown at 13 in Figure 2 and is also flared laterally as shown at 14 in Figure 1 so that an expansion coil spring 15 may be braced between this flared end and the clips 10, which the said spring embraces, to aid in holding the expander in position as will be understood. A portion of the end of the casing 6 of the nut 2 opposite to the end in which is the socket 8 is split and sprung outwardly as at 16 so that it may serve in the usual manner as a lock washer.

In the use of the device the nut 2 is threaded on the bolt 1 in engagement with the work. The threaded plug 9 carrying the expander 12 is then threaded in the socket 8 by inserting a screw driver (not shown) in the kerf 21 in the threaded plug or by any other suitable means. By screwing this threaded plug 9 inward into the nut 2 the expander 12 will enter the slot 5 in the bolt and expand the end of this bolt outward so that the threads upon the bolt will firmly grip the threads in the bore 7 and securely hold the nut in place.

In Figures 3 and 4 the bolt 17 and nut 18 are designed particularly for use in wood or other relatively soft material. The bolt 17 is threaded and has the slot 19 for the reception of the bolt expander as hereinbefore set forth and has its end rounded as shown to facilitate its insertion into the wood. The nut 18 differs from the hereinbefore described nut 2 only in that it has a diametrically enlarged lock washer 20 formed on one end so that it will afford a greater bearing surface upon the wood.

While I have herein set forth certain preferred embodiments of my invention it is understood that I may vary from the same in minor structural details not departing from the spirit of the invention and within the scope of the appended claims.

I claim:

1. In a nut lock, in combination, a bolt having its threaded end slotted longitudinally, a nut mounted upon the threaded end of the bolt, the said nut having its bore diametrically enlarged at its outer end to form a socket, a threaded plug mounted in the said socket, spring clips upon the inner face of the said plug, a flat, wedge-like bolt expander rotatively seated in the spring clips, the opposite end of the said expander being adapted to enter into the said longitudinal slot of the bolt.

2. In a nut lock, in combination, a bolt having its threaded end slotted longitudinally, a nut mounted upon the threaded end of the bolt, the said nut having its bore diametrically enlarged at its outer end to form a socket, a threaded plug mounted in the said socket, spring clips upon the inner face of the said plug, a flat, wedge-like bolt expander rotatively seated in the spring clips, the opposite end of the said expander being adapted to enter into the said longitudinal slot of the bolt, and means for supporting the said bolt expander in operative position.

In testimony whereof I affix my signature.

AMSIH J. ELIAS.